Figure 1:
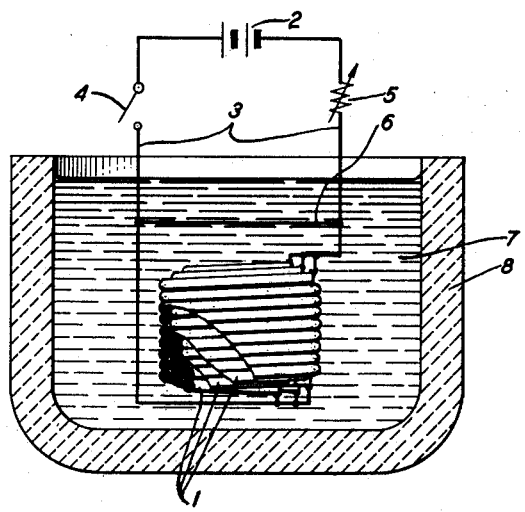

April 14, 1964   J. E. KUNZLER   3,129,359
SUPERCONDUCTING MAGNET CONFIGURATION
Filed Sept. 19, 1960

INVENTOR
J. E. KUNZLER
BY
ATTORNEY

United States Patent Office 3,129,359
Patented Apr. 14, 1964

3,129,359
SUPERCONDUCTING MAGNET CONFIGURATION
John E. Kunzler, Washington, N.J., assignor to Bell Telephone Laboratories, Incorporated, New York, N.Y., a corporation of New York
Filed Sept. 19, 1960, Ser. No. 56,748
6 Claims. (Cl. 317—123)

This invention relates to superconducting electromagnets and more particularly to such magnets utilizing an improved coil arrangement which enhances the maximum magnetic field strength exhibited by the magnet.

Attention in the art has recently been directed to the production of magnetic fields by means of superconducting electromagnets consisting of one or more concentric coils of a superconducting wire material about a common core. These magnets have the advantages of compactness and practically negligible power requirements. Persistent currents can be set up in the superconducting coils allowing one to disconnect the power supply altogether. A completely stable magnetic field is thus maintained as long as the coils are kept at or below their critical temperature and critical field. These magnets are also well adapted for those uses requiring alternating or rapidly varying fields. For such use, an external power source is connected to the coils during operation.

The field strength exhibited by a magnet is dependent on the number of coils times the number of windings per coil times the amperes flowing through the coil. To obtain a maximum field, it is desirable to maintain a current in the coils such that each coil has associated with it a field approximating its critical field. In a conventional series wound superconducting magnet configuration, consisting of several concentric coils, the critical current is limited by the field acting on the innermost coil. This field is composed of the field induced by current flowing through the coil and the internal field of the magnet. This current, however, is not sufficient to induce a critical field in the outer coils where the effect of the internal field is almost negligible. As such the maximum field exhibited by the magnet is significantly less than it theoretically could be since all coils are not operated near their critical field.

In accordance with the instant invention, it has been determined that when some or all of the coils of a superconducting magnet are connected in parallel the magnet exhibits a higher maximum field than when all the coils are connected in series. In particular, it has been determined that the parallel coil arrangement allows more current to flow through the outer coils where the internal field is low with a resulting increase in the maximum field exhibited by the magnet.

In such a parallel coil configuration, the coils are self-balancing. As the inner coil approaches its critical field finite resistance to current flow is set up. This resistance diverts current to the outer coils which have a higher tolerable critical current due to the lower internal field acting on these coils. As a result, each parallel connected coil operates closer to its critical field than is permissible in the series configuration.

Figure 2:
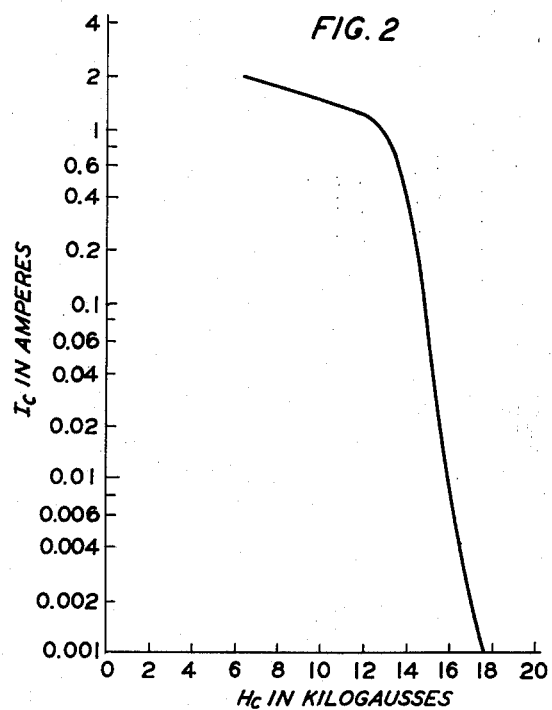

A more complete understanding of the invention may be gained from reference to the following drawing, in which:

FIG. 1 is a front elevational view partly in section of a superconducting magnet and is illustrative of one embodiment of the invention wherein the coils are connected in parallel; and FIG. 2 is a plot of critical current in amperes versus external critical field in kilogauss which illustrates the dependence of the critical current on the external critical field.

Referring again to FIG. 1, there is shown a superconducting electromagnet utilizing a plurality of concentric coils 1 connected in parallel. Coils 1 are connected to an external power source such as battery 2 by means of leads 3, switch 4 and variable resistor 5. Resistor 5 permits the current from the power source 2 to coils 1 to be varied. Leads 3 are connected by shunt 6. Coils 1 and shunt 6 are suspended in a low temperature environment 7 such as liquid helium. Typically, the low temperature environment is maintained in a Dewar flask 8.

Coils 1 are formed of a superconducting wire material. In general, any superconducting material which exhibits the requisite critical field for the intended use and is sufficiently ductile to permit its being drawn to a wire configuration may be utilized. Typical superconducting materials are the molybdenum-rhenium alloys containing at least 20 percent rhenium and the bismuth-lead alloys containing at least 10 percent lead. A listing of other superconducting materials is found in Recent Advances in Science, 1956, pages 324–326, published by the New York University Press. Those portions of leads 3 from shunt 6 to coils 1 are formed of a suitable superconducting wire material. Those portions of leads 3 connecting the external power source 2 and shunt 6 are made of either a superconducting or a low resistance wire material. Preferably a low resistance such as copper, nickel or platinum is utilized since superconducting materials generally exhibit a higher resistance in their normal state than low resistance materials. Depending on the intended use shunt 6 is formed of either a superconducting material or a low resistance material. When it is desired to establish a persistent current in the coils, shunt 6 is formed of a superconducting material. By means of power supply 2, a current is established in coils which are maintained in a superconducting state by low temperature environment 7. Shunt 6 is then placed in the low temperature environment to make it superconducting and power supply 2 is disconnected by means of switch 4. A completely stable magnetic field is thereby established by the frozen-in current which will continue to flow through coils 1 and shunt 6 as long as the shunt, the coils and those portions of leads 3 connecting the shunt and the coils are kept at or below their critical temperature and critical field.

When, however, it is desired to utilize an external power source during operation so as to permit rapid variation of the magnetic field, shunt 6 is eliminated or desirably formed of a low resistance material. The use of a low resistance material acts as a safety factor in case coils 1 should return to their normal state. In their normal state, coils 1 exhibit a higher resistance than that of the low resistance shunt. Accordingly, current from the external power source is automatically diverted through the shunt and does not pass through the coils. Such diversion minimizes the danger that current flowing through the high resistivity coil material will create sufficient heat to injure the coil.

FIG. 2 shows the field dependence of the critical current in a section of 0.007 centimeter diameter, 75 atom percent molybdenum-25 atom percent rhenium wire maintained at 1.5° K. assuming an external magnetic field perpendicular to the wire. This plot illustrates the basic theory underlying the parallel coil configuration of the instant invention. As previously discussed, the action of the magnetic field of the electromagnet is strongest on the inner coils and weakest on the outer coils. Assuming that a typical electromagnet exhibits a field strength of approximately 18 kilogauss on the inner coils, reference to the curve shows that the maximum current that can be carried in the inner coils without destroying superconductivity is 0.001 amperes. Since in a series arrangement the same current flows through all coils, this is the current flowing through the outer coils also. However, assuming that the field strength decreases to 6 kilogauss in the vicinity of the outer coils, it is apparent that these coils could carry a current of approximately 2 amperes. By means of the instant parallel coil configuration, current through the various coils can be adjusted so that each coil carries the maximum current commensurate with maintaining superconductivity.

A specific example of one superconducting electromagnet made in accordance with the present invention follows.

*Example.*—A solenoid was formed with 0.007 centimeter diameter gold coated 75 atom percent molybdenum-25 atom percent rhenium wire on a coil form that was 3 centimeters long and had a core of 0.3 centimeter. The gold plating served as insulation between windings of the coils and in addition the coils were separated with a 0.001 centimeter coat of Mylar. The solenoid had a total of 30,000 windings and consisted of 100 concentric coils, each coil, therefore, having 300 windings. The outside diameter of the solenoid was approximately two centimeters. The windings were brought out of the solenoid at three appropriate sections, each section consisting of 30, 30 and 40 coils, respectively; the 40-coil section being adjacent the core. In this manner, the sections, depending on the connection, could be operated with current in both parallel and series. The magnetic field in the core of the solenoid was measured with a small magnetic field probe. The solenoid was operated with all of the windings in series and also with the three sections in parallel. When the three sections were connected in parallel the solenoid exhibited a maximum field of 15.6 kilogauss. In contrast, when the three sections were operated in series, the solenoid exhibited a maximum field of 14 kilogauss.

Of necessity, the invention is described in a limited number of embodiments. Alternative embodiments readily apparent to those skilled in the art are intended to be within the scope of the appended claims. For example, in that embodiment depicted in FIG. 1, the gap between the coils can be maintained at either room or elevated temperatures. This permits the magnetic field of the coils to act on bodies placed in the gap that are maintained at elevated temperatures in comparison to the low temperature environment of the coils. Additionally, the inner coils of the magnet can be formed of a higher critical field superconducting material, such as niobium-tin, than the outer coils which are typically formed of more malleable materials such as molybdenum-rhenium and bismuth-lead alloys. This embodiment permits more current to flow through the inner coils where the internal magnetic field is the greatest. Although the illustrative embodiment of FIG. 1 depicts only three concentric coils, this number can be advantageously increased to a practical maximum depending, for example, on the field strength desired and the space limitations of the environment in which the magnet is intended to operate.

Whenever in the specification and appended claims reference is had to concentric coils, such terminology is intended to mean layers of turns of wire about a common core.

What is claimed is:

1. A superconducting magnet including a multiplicity of coils of superconducting wires, at least two of said coils being electrically connected in parallel.

2. A superconducting magnet in accordance with claim 1 wherein the wires consist essentially of a superconducting alloy of molybdenum-rhenium.

3. A superconducting magnet in accordance with claim 1 wherein the wires consist essentially of a superconducting alloy of bismuth-lead.

4. A superconducting magnet including a multiplicity of concentric coils of a superconducting wire, at least two of said coils being electrically connected in parallel, leads connecting said coils with a power source, and a shunt connecting said leads, together with means sufficient to reduce the temperature of said coils to a temperature below their critical temperature.

5. A superconducting magnet in accordance with claim 4 wherein said shunt is formed of a low resistance material.

6. A superconducting magnet in accordance with claim 4 wherein said shunt is formed of a superconducting material.

References Cited in the file of this patent

UNITED STATES PATENTS 2,946,030    Slade  ---------------- July 19, 1960
2,966,598    Mackay  ------------- Dec. 27, 1960

OTHER REFERENCES

"Superconducting Electromagnets," article in The Review of Scientific Instruments, by S. H. Autler, pages 369–373, April 1960.